United States Patent
Sonobe et al.

(10) Patent No.: US 11,742,489 B2
(45) Date of Patent: Aug. 29, 2023

(54) BINDER COMPOSITION FOR SECONDARY BATTERY POSITIVE ELECTRODE, SLURRY COMPOSITION FOR SECONDARY BATTERY POSITIVE ELECTRODE AND METHOD OF PRODUCING SAME, POSITIVE ELECTRODE FOR SECONDARY BATTERY, AND SECONDARY BATTERY

(71) Applicant: ZEON CORPORATION, Tokyo (JP)

(72) Inventors: Kenya Sonobe, Tokyo (JP); Hiroki Oguro, Tokyo (JP); Maki Mesuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 330 days.

(21) Appl. No.: 16/958,151

(22) PCT Filed: Dec. 14, 2018

(86) PCT No.: PCT/JP2018/046071
§ 371 (c)(1),
(2) Date: Jun. 26, 2020

(87) PCT Pub. No.: WO2019/131210
PCT Pub. Date: Jul. 4, 2019

(65) Prior Publication Data
US 2021/0066720 A1    Mar. 4, 2021

(30) Foreign Application Priority Data

Dec. 28, 2017  (JP) ................................ 2017-254287

(51) Int. Cl.
*H01M 4/62*  (2006.01)
*H01M 4/139*  (2010.01)
*H01M 4/36*  (2006.01)
*H01M 10/0525*  (2010.01)
*C08F 220/18*  (2006.01)
*C08F 236/10*  (2006.01)
*C08F 236/12*  (2006.01)
*H01M 4/02*  (2006.01)

(52) U.S. Cl.
CPC .......... *H01M 4/622* (2013.01); *C08F 220/18* (2013.01); *C08F 236/10* (2013.01); *C08F 236/12* (2013.01); *H01M 4/139* (2013.01); *H01M 4/36* (2013.01); *H01M 4/364* (2013.01); *H01M 10/0525* (2013.01); *H01M 2004/028* (2013.01)

(58) Field of Classification Search
CPC .......... H01M 4/60; H01M 4/62; H01M 4/149; H01M 10/0525
See application file for complete search history.

(56) References Cited

U.S. PATENT DOCUMENTS

| 2014/0121329 A1 | 5/2014 | Araki et al. | |
| 2015/0050554 A1 | 2/2015 | Fukumine et al. | |
| 2015/0083975 A1* | 3/2015 | Yeou | H01M 4/13 525/199 |
| 2015/0086875 A1* | 3/2015 | Yoshida | H01M 4/139 429/304 |

FOREIGN PATENT DOCUMENTS

| JP | 2013008485 A | 1/2013 |
| JP | 2013179040 A | 9/2013 |
| JP | 2014203804 A | 10/2014 |
| WO | 2012165120 A1 | 12/2012 |
| WO | 2013080989 A1 | 6/2013 |

OTHER PUBLICATIONS

Machine Translation of: JP 2013-179040 A, Fukumine et al. Sep. 9, 2013.*
Jun. 30, 2020, International Preliminary Report on Patentability issued in the International Patent Application No. PCT/JP2018/046071.
Feb. 5, 2019, International Search Report issued in the International Patent Application No. PCT/JP2018/046071.
Jun. 10, 2021, the Extended European Search Report issued by the European Patent Office in the corresponding European Patent Application No. 18896382.1.
Rongrong Qi et al., Modification of Acrylonitrile—Butadiene—Styrene Terpolymer by Grafting with Maleic Anhydride in the Melt. I. Preparation and Characterization, Journal of Applied Polymer Science, 2003, pp. 1249-1254, vol. 90.

* cited by examiner

*Primary Examiner* — Kenneth J Douyette
(74) *Attorney, Agent, or Firm* — Kenja IP Law PC

(57) ABSTRACT

A binder composition for a secondary battery positive electrode contains a polymer including a nitrile group-containing monomer unit, an aromatic vinyl monomer unit, a hydrophilic group-containing monomer unit, a conjugated diene monomer unit, and a linear alkylene structural unit having a carbon number of 4 or more. The aromatic vinyl monomer unit is included in the polymer in a proportion of not less than 30.0 mass % and not more than 60.0 mass %. The polymer has an iodine value of not less than 60 mg/100 mg and not more than 150 mg/100 mg.

9 Claims, No Drawings

BINDER COMPOSITION FOR SECONDARY BATTERY POSITIVE ELECTRODE, SLURRY COMPOSITION FOR SECONDARY BATTERY POSITIVE ELECTRODE AND METHOD OF PRODUCING SAME, POSITIVE ELECTRODE FOR SECONDARY BATTERY, AND SECONDARY BATTERY

TECHNICAL FIELD

The present disclosure relates to a binder composition for a secondary battery positive electrode, a slurry composition for a secondary battery positive electrode and method of producing the same, a positive electrode for a secondary battery, and a secondary battery.

BACKGROUND

Secondary batteries such as lithium ion secondary batteries have characteristics such as compact size, light weight, high energy-density, and the ability to be repeatedly charged and discharged, and are used in a wide range of applications. Therefore, studies have been carried out in recent years to further raise the performance of secondary batteries through improvement of electrodes and other battery components.

A positive electrode used in a secondary battery such as a lithium ion secondary battery generally includes a current collector and an electrode mixed material layer (positive electrode mixed material layer) formed on the current collector. The positive electrode mixed material layer is formed, for example, using a slurry composition in which a positive electrode active material, a binder composition containing a binder, and so forth are dispersed in a dispersion medium.

In order to further improve secondary battery performance, attempts have been made in recent years to improve binder compositions used in positive electrode mixed material layer formation.

As one specific example, Patent Literature (PTL) 1 discloses a binder composition for a secondary battery positive electrode that is a binder including a nitrile group-containing polymerization unit, an aromatic vinyl polymerization unit, a hydrophilic group-containing polymerization unit, and a linear alkylene polymerization unit having a carbon number of 4 or more, and in which the aromatic vinyl polymerization unit is included in a proportion of 5 mass % to 50 mass %. Through use of this binder composition, it is possible to provide a secondary battery having excellent cycle characteristics and the like.

CITATION LIST

Patent Literature

PTL 1: JP2013-179040A

SUMMARY

Technical Problem

However, there is room for further improvement of output characteristics and cycle characteristics of a secondary battery that is formed using the conventional binder composition for a positive electrode described above.

Accordingly, one object of the present disclosure is to provide a binder composition for a secondary battery positive electrode and a slurry composition for a secondary battery positive electrode that can be used to form a secondary battery having excellent output characteristics and cycle characteristics, and also to provide a method of producing this slurry composition.

Another object of the present disclosure is to provide a positive electrode that can improve output characteristics and cycle characteristics of an obtained secondary battery and a secondary battery that has excellent output characteristics and cycle characteristics.

Solution to Problem

The inventors conducted diligent investigation with the aim of solving the problem set forth above. The inventors found that when a positive electrode of a secondary battery contains a polymer that includes a nitrile group-containing monomer unit, an aromatic vinyl monomer unit, a hydrophilic group-containing monomer unit, a conjugated diene monomer unit, and a linear alkylene structural unit having a carbon number of 4 or more, that includes the aromatic vinyl monomer unit in a proportion that is within a specific range, and that has an iodine value that is within a specific range, both output characteristics and cycle characteristics of the secondary battery can be enhanced in a good balance. In this manner, the inventors completed the present disclosure.

Specifically, the present disclosure aims to advantageously solve the problem set forth above, and a presently disclosed binder composition for a secondary battery positive electrode comprises a polymer, wherein the polymer includes a nitrile group-containing monomer unit, an aromatic vinyl monomer unit, a hydrophilic group-containing monomer unit, a conjugated diene monomer unit, and a linear alkylene structural unit having a carbon number of 4 or more, the aromatic vinyl monomer unit is included in the polymer in a proportion of not less than 30.0 mass % and not more than 60.0 mass %, and the polymer has an iodine value of not less than 60 mg/100 mg and not more than 150 mg/100 mg. When the proportion in which the aromatic vinyl monomer unit is included in the polymer and the iodine value of the polymer are adjusted to within the ranges set forth above in this manner, the binder composition for a secondary battery positive electrode that contains the polymer can be used to form a secondary battery having excellent output characteristics and cycle characteristics.

Note that the phrase "includes a monomer unit" as used with respect to a polymer means that "a polymer obtained with the monomer includes a structural unit derived from the monomer". Moreover, "includes a linear alkylene structural unit having a carbon number of 4 or more" means that a repeating unit composed of only a linear alkylene structure represented by a general formula —$C_nH_{2n}$— (n is an integer of 4 or more) is included in a polymer. Furthermore, the proportion in which a monomer unit is included in a polymer can be measured by $^1$H-NMR, for example. Also, the "iodine value" of a polymer can be measured in accordance with JIS K6235(2006).

In the presently disclosed binder composition for a secondary battery positive electrode, it is preferable that when a total proportion in which the conjugated diene monomer unit and the linear alkylene structural unit having a carbon number of 4 or more are included in the polymer is taken to be A mass %, a proportion in which the aromatic vinyl monomer unit is included in the polymer is taken to be B mass %, and the iodine value of the polymer is taken to be IV (mg/100 mg), a relationship of $10 \leq \{A/(A+B)\} \times IV \leq 90$ is satisfied. When the polymer satisfies the relationship set forth above, output characteristics and cycle characteristics of a secondary battery obtained using the binder composition can be further enhanced.

In the presently disclosed binder composition for a secondary battery positive electrode, the polymer preferably includes an acidic group-containing monomer unit in a proportion of not less than 0.1 mass % and not more than 20.0 mass % as the hydrophilic group-containing monomer unit. When the proportion in which an acidic group-containing monomer unit is included in the polymer is within a range of not less than 0.1 mass % and not more than 20.0 mass %, output characteristics and cycle characteristics of a secondary battery obtained using the binder composition can be further enhanced.

In the presently disclosed binder composition for a secondary battery positive electrode, the polymer preferably further includes a (meth)acrylic acid ester monomer unit. When the polymer further includes a (meth)acrylic acid ester monomer unit, cycle characteristics of a secondary battery obtained using the binder composition can be further enhanced. In the present specification, "(meth)acryl" is used to indicate "acryl" and/or "methacryl".

In the presently disclosed binder composition for a secondary battery positive electrode, the polymer preferably includes the (meth)acrylic acid ester monomer unit in a proportion of not less than 1.0 mass % and not more than 20.0 mass %. When the proportion in which a (meth)acrylic acid ester monomer unit is included in the polymer is within a range of not less than 1.0 mass % and not more than 20.0 mass %, output characteristics and cycle characteristics of a secondary battery obtained using the binder composition can be further enhanced.

Also, the present disclosure aims to advantageously solve the problem set forth above, and a presently disclosed slurry composition for a secondary battery positive electrode comprises: a positive electrode active material; a solvent; and any one of the binder compositions for a secondary battery positive electrode set forth above. Through the presently disclosed slurry composition for a secondary battery positive electrode, it is possible to form a secondary battery having excellent output characteristics and cycle characteristics.

Moreover, the present disclosure aims to advantageously solve the problem set forth above, and a presently disclosed positive electrode for a secondary battery comprises a positive electrode mixed material layer formed using the slurry composition for a secondary battery positive electrode set forth above. By using the slurry composition for a secondary battery positive electrode set forth above in this manner, it is possible to obtain a positive electrode for a secondary battery that can improve output characteristics and cycle characteristics of an obtained secondary battery.

Furthermore, the present disclosure aims to advantageously solve the problems set forth above, and a presently disclosed secondary battery comprises: the positive electrode for a secondary battery set forth above; a negative electrode; an electrolyte solution; and a separator. By using the positive electrode for a secondary battery set forth above in this manner, it is possible to enhance output characteristics and cycle characteristics of a secondary battery.

Also, the present disclosure aims to advantageously solve the problems set forth above, and a presently disclosed method of producing a slurry composition for a secondary battery positive electrode comprises, in stated order: mixing a positive electrode active material and a conductive material to obtain a positive electrode active material-conductive material mixture; adding any one of the binder compositions for a secondary battery positive electrode set forth above to the positive electrode active material-conductive material mixture to obtain a positive electrode active material-conductive material-binder mixture; and adding a solvent to the positive electrode active material-conductive material-binder mixture and mixing the solvent therewith. Through a production method such as set forth above, it is possible to obtain a slurry composition for a secondary battery positive electrode in which dispersibility of a conductive material is excellent.

Advantageous Effect

According to the present disclosure, it is possible to provide a binder composition for a secondary battery positive electrode and a slurry composition for a secondary battery positive electrode that can be used to form a secondary battery having excellent output characteristics and cycle characteristics, and also to provide a method of producing this slurry composition.

Moreover, according to the present disclosure, it is possible to provide a positive electrode that can improve output characteristics and cycle characteristics of an obtained secondary battery and a secondary battery that has excellent output characteristics and cycle characteristics.

DETAILED DESCRIPTION

The following provides a detailed description of embodiments of the present disclosure.

The presently disclosed binder composition for a secondary battery positive electrode can be used in production of a slurry composition for a secondary battery positive electrode. Moreover, a slurry composition for a secondary battery positive electrode that is produced using the presently disclosed binder composition for a secondary battery positive electrode can be used in formation of a positive electrode of a secondary battery such as a lithium ion secondary battery. Furthermore, a feature of the presently disclosed secondary battery is that a positive electrode for a secondary battery formed using the presently disclosed slurry composition for a secondary battery positive electrode is used therein.

(Binder Composition for Secondary Battery Positive Electrode)

The presently disclosed binder composition for a secondary battery positive electrode is a binder composition for a secondary battery positive electrode that contains a polymer. The polymer includes a nitrile group-containing monomer unit, an aromatic vinyl monomer unit, a hydrophilic group-containing monomer unit, a conjugated diene monomer unit, and a linear alkylene structural unit having a carbon number of 4 or more. In addition, features of the polymer are that the proportion in which the aromatic vinyl monomer unit is included in the polymer is not less than 30.0 mass % and not more than 60.0 mass % and the iodine value of the polymer is not less than 60 mg/100 mg and not more than 150 mg/100 mg.

A binder composition including a polymer that satisfies the chemical composition and property set forth above can enhance both output characteristics and cycle characteristics of an obtained secondary battery. Although the reason for this is not clear, it is presumed to be as follows. The polymer is assumed to effectively inhibit both aggregation and excessive dispersion of solid content, inclusive of an electrode active material and the like, in a slurry composition through, in particular, a synergistic effect of 30.0 mass % or more of an aromatic vinyl monomer unit being included in the polymer and the iodine value of the polymer being 60 mg/100 mg or more. As a result, it is possible to form a secondary battery having low internal resistance and excellent output characteristics. Moreover, the polymer has a suitable degree of flexibility due to the proportion in which an aromatic vinyl monomer unit is included being 60.0 mass % or less. This flexibility is presumed to contribute to improving electrode density when heating and pressing are performed during production of a positive electrode using the binder composition and is also presumed to contribute to enhancing cycle characteristics of a secondary battery. Furthermore, as a result of the iodine value of the polymer being 150 mg/100 mg or less and the content ratio of carbon-carbon double bonds in the polymer being a suitably low level, the polymer has high structural stability and can enhance cycle characteristics of a secondary battery.

<Polymer>

The polymer is a component that functions as a binder and that, in a positive electrode produced by forming a positive electrode mixed material layer on a current collector using a slurry composition for a secondary battery positive electrode produced using the binder composition, holds components contained in the positive electrode mixed material layer so that these components do not become detached from the positive electrode mixed material layer. Moreover, the polymer is required to include a nitrile group-containing monomer unit, an aromatic vinyl monomer unit, a hydrophilic group-containing monomer unit, a conjugated diene monomer unit, and a linear alkylene structural unit having a carbon number of 4 or more, to include the aromatic vinyl monomer unit in a proportion of not less than 30.0 mass % and not more than 60.0 mass %, and to have an iodine value of not less than 60 mg/100 mg and not more than 150 mg/100 mg. Note that the polymer may optionally include other monomer units such as a (meth)acrylic acid ester monomer unit so long as the effects disclosed herein are not lost. The polymer is preferably a hydrogenated polymer obtained by using a known method to hydrogenate a polymer obtained through polymerization of a monomer composition containing a nitrile group-containing monomer, an aromatic vinyl monomer, a hydrophilic group-containing monomer, and a conjugated diene monomer, and optionally further containing other monomers such as a (meth)acrylic acid ester monomer.

[Nitrile Group-Containing Monomer Unit]

The nitrile group-containing monomer unit is a repeating unit that is derived from a nitrile group-containing monomer. As a result of the polymer including a nitrile group-containing monomer unit, the polymer itself has high strength, and thus it is presumed that when the binder composition is used to form a positive electrode mixed material layer on a current collector, adhesive strength between the positive electrode mixed material layer and the current collector is increased, and the positive electrode mixed material layer becomes harder to peel from the current collector (i.e., peel strength of the positive electrode increases). This is presumed to enable enhancement of cycle characteristics of an obtained secondary battery.

Examples of nitrile group-containing monomers that can be used to form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable as the nitrile group-containing monomer from a viewpoint of increasing binding strength of the polymer, with acrylonitrile being more preferable.

One of these nitrile group-containing monomers may be used individually, or two or more of these nitrile group-containing monomers may be used in combination.

The proportion in which the nitrile group-containing monomer unit is included in the polymer when all repeating units in the polymer are taken to be 100 mass % is preferably 5 mass % or more, more preferably 7 mass % or more, and even more preferably 10 mass % or more, and is preferably 25 mass % or less, more preferably 20 mass % or less, and even more preferably 15 mass % or less. When the proportion in which the nitrile group-containing monomer unit is included in the polymer is not less than any of the lower limits set forth above, output characteristics and cycle characteristics of an obtained secondary battery can be further enhanced. This is presumed to be because by setting the proportion of a nitrile group-containing monomer unit having high polarity as not less than any of the lower limits set forth above, the softening temperature of the polymer is increased to a suitable level, which can improve binding strength of the polymer and can increase peel strength of a positive electrode formed using the binder composition. This can increase adhesive strength between a positive electrode mixed material layer and a current collector and can reduce internal resistance of a secondary battery to thereby further enhance output characteristics of the secondary battery. Moreover, when the proportion in which the nitrile group-containing monomer unit is included in the polymer is not more than any of the upper limits set forth above, it is possible to inhibit reduction of close adherence between an electrode mixed material layer and a current collector accompanying repeated charging and discharging and to enhance cycle characteristics of a secondary battery.

[Aromatic Vinyl Monomer Unit]

The aromatic vinyl monomer unit is a repeating unit that is derived from an aromatic vinyl monomer. As a result of the polymer including an aromatic vinyl monomer unit in a proportion that is within the previously described range, the polymer enables good dispersion of solid content in a slurry composition when it is contained in the slurry composition. Moreover, the use of this slurry composition enables good formation of a positive electrode having high density.

Examples of monomers that can form the aromatic vinyl polymerization unit include aromatic vinyl monomers such as styrene, α-methylstyrene, and vinyltoluene. Of these aromatic vinyl monomers, styrene is preferable because it has good copolymerizability with other monomers and comparatively few side reactions such as branching reaction, chain reaction, and intermolecular cross-linking of the polymer.

The proportion in which the aromatic vinyl monomer unit is included in the polymer when all repeating units in the polymer are taken to be 100 mass % is required to be not less than 30.0 mass % and not more than 60.0 mass %, is preferably 32.0 mass % or more, and more preferably 40.0 mass % or more, and is preferably 55.0 mass % or less, more preferably 50.0 mass % or less, and even more preferably 48.0 mass % or less. When the proportion in which the aromatic vinyl monomer unit is included in the polymer is not less than any of the lower limits set forth above, dispersibility of solid content in a slurry composition that contains the binder composition can be increased to a suitable degree. Moreover, when the proportion in which the aromatic vinyl monomer unit is included in the polymer is not more than any of the upper limits set forth above, the density of a positive electrode formed using a slurry composition that contains the binder composition can be increased, and, as a result, output characteristics of a secondary battery that includes the positive electrode can be enhanced. The reason for this is presumed to be that by setting the proportion in which the aromatic vinyl monomer unit is included in the polymer as not more than any of the upper limits set forth above, the polymer has a suitable degree of flexibility, which makes it possible to facilitate pressing during electrode formation and also for increased electrode density resulting from pressing to be more easily maintained after pressing (i.e., the occurrence of "spring-back" can be inhibited).

Furthermore, the "proportion of the nitrile group-containing monomer unit" and the "proportion of the aromatic vinyl monomer unit" in the polymer preferably satisfy a relationship of 0.05 (proportion of nitrile group-containing monomer unit [mass %])/(proportion of aromatic vinyl monomer unit [mass %]) 0.60, and more preferably satisfy a relationship of 0.10 (proportion of nitrile group-containing monomer unit [mass %])/(proportion of aromatic vinyl monomer unit [mass %]) 0.45. When any of these relationships is satisfied, it is possible to achieve an even better balance of inhibiting spring-back during electrode formation and enhancing output characteristics of an obtained secondary battery.

[Hydrophilic Group-Containing Monomer Unit]

The hydrophilic group-containing monomer unit is a repeating unit that is derived from a hydrophilic group-containing monomer. The polymer can further enhance cycle characteristics of an obtained secondary battery as a result of including the hydrophilic group-containing monomer unit.

Examples of hydrophilic group-containing monomers that can form the hydrophilic group-containing monomer unit include acidic group-containing monomers, hydroxy group-containing monomers, and monomers including salts thereof and the like. Examples of acidic groups that can be included in an acidic group-containing monomer include a carboxyl group, a sulfo group, and a phosphate group. Note that a unit that corresponds to a nitrile group-containing monomer unit or an aromatic vinyl monomer unit such as described above and that also includes a hydrophilic group is considered to be included among hydrophilic group-containing monomer units rather than nitrile group-containing monomer units/aromatic vinyl monomer units.

Examples of carboxyl group-containing monomers include monocarboxylic acids, derivatives of monocarboxylic acids, dicarboxylic acids, and derivatives of dicarboxylic acids.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

An acid anhydride that produces a carboxyl group through hydrolysis can also be used.

Examples of acid anhydrides of dicarboxylic acids include maleic anhydride, acrylic anhydride, methylmaleic anhydride, and dimethylmaleic anhydride.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1—COO—(C_nH_{2n}O)_m—H$ (where m represents an integer of 2 to 9, n represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

Of these examples, the hydrophilic group-containing monomer is preferably an acidic group-containing monomer that is a monomer including a carboxyl group or a sulfo group because this provides excellent binding capacity amongst a positive electrode active material and excellent binding capacity between a positive electrode mixed material layer and a subsequently described current collector, and is preferably a carboxyl group-containing monomer because this enables efficient capture of transition metal ions, which may elute particularly from a positive electrode active material.

The proportion in which the hydrophilic group-containing monomer unit is included in the polymer when all repeating units in the polymer are taken to be 100 mass % is preferably 0.1 mass % or more, and is preferably 20.0 mass % or less, more preferably 15.0 mass % or less, and even more preferably 10.0 mass % or less. When the proportion in which the hydrophilic group-containing monomer unit is included in the polymer is not less than the lower limit set forth above, cycle characteristics of an obtained secondary battery can be further enhanced. Although the reason for this is not clear, it is presumed that in the same way as for the nitrile group-containing monomer unit, the hydrophilic group-containing monomer unit in the polymer improves binding strength of the polymer and can increase peel strength of a positive electrode formed using the binder composition. Moreover, when the proportion in which the hydrophilic group-containing monomer unit is included in the polymer is not more than any of the upper limits set forth above, an excessive increase of the degree of swelling in electrolyte solution of the polymer can be well inhibited. This enables further enhancement of output characteristics of an obtained secondary battery.

[Conjugated Diene Monomer Unit]

The conjugated diene monomer unit is a repeating unit that is derived from a conjugated diene monomer. It is assumed that as a result of the polymer including a conjugated diene monomer, a synergistic effect with the aromatic vinyl monomer unit makes it possible to effectively inhibit both aggregation and excessive dispersion of solid content, inclusive of an electrode active material and the like, in a slurry composition. As a result, it is possible to form a secondary battery having low internal resistance and excellent output characteristics.

Examples of conjugated diene monomers that can form the conjugated diene monomer unit include conjugated diene compounds having a carbon number of 4 or more such as 1,3-butadiene, isoprene, 2,3-dimethyl-1,3-butadiene, and 1,3-pentadiene. Of these conjugated diene monomers, 1,3-butadiene is preferable. One of these conjugated diene monomers may be used individually, or two or more of these conjugated diene monomers may be used in combination.

[Linear Alkylene Structural Unit having Carbon Number of 4 or more]

The linear alkylene structural unit having a carbon number of 4 or more (hereinafter, also referred to simply as the "alkylene structural unit") is a repeating unit composed of only a linear alkylene structure having a carbon number of 4 or more that is represented by a general formula $-C_nH_{2n}-$ (n is an integer of 4 or more). As a result of the polymer including the linear alkylene structural unit having a carbon number of 4 or more, the polymer can be inhibited from readily swelling in a positive electrode in accompaniment to charging and discharging, close adherence between a current collector and a positive electrode mixed material layer can be improved, and cycle characteristics of a secondary battery can be enhanced.

The method by which the linear alkylene structural unit having a carbon number of 4 or more is introduced into the polymer is not specifically limited and may, for example, be either of the following methods (1) and (2).

(1) A method in which a polymer is produced from a monomer composition containing a conjugated diene monomer and then the polymer is hydrogenated to convert a conjugated diene monomer unit to a linear alkylene structural unit having a carbon number of 4 or more (2) A method in which a polymer is produced from a monomer composition containing a 1-olefin monomer having a carbon number of 4 or more The conjugated diene monomer and the 1-olefin monomer referred to above can each be one type of monomer used individually or two or more types of monomers used in combination.

Of these methods, method (1) is preferable in terms of ease of production of the polymer.

Examples of conjugated diene monomers that can be used in method (1) include the various compounds that were previously described in the "Conjugated diene monomer unit" section, of which, 1,3-butadiene is preferable. In other words, the linear alkylene structural unit having a carbon number of 4 or more is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit). Selective hydrogenation of the conjugated diene monomer unit can be carried out by a commonly known method such as an oil-layer hydrogenation method or a water-layer hydrogenation method.

The polymer includes both a linear alkylene structural unit having a carbon number of 4 or more and a conjugated diene monomer unit. The total proportion in which the linear alkylene structural unit having a carbon number of 4 or more and the conjugated diene monomer unit are included in the polymer when all repeating units (total of structural units and monomer units) in the polymer are taken to be 100 mass % is preferably 10.0 mass % or more, and more preferably 15.0 mass % or more, and is preferably 60.0 mass % or less, more preferably 55.0 mass % or less, and even more preferably 50.0 mass % or less. When the total proportion mentioned above is not less than any of the lower limits set forth above, an excessive rise of the glass-transition temperature of the polymer can be inhibited, and, as a result, density can be effectively increased in a pressing step during positive electrode production. Moreover, when this total proportion is not less than any of the lower limits set forth above, the polymer has a suitable degree of flexibility, the ease of pressing in a pressing step can be increased, and the occurrence of spring-back can be inhibited. On the other hand, when this total proportion is not more than any of the upper limits set forth above, dispersibility of solid content in a slurry composition can be increased to a suitable degree, and internal resistance of a secondary battery that is ultimately obtained can be reduced. As a result, output characteristics of the secondary battery can be improved.

Note that in a case in which the polymer is a hydrogenated polymer, the proportion in which the linear alkylene structural unit having a carbon number of 4 or more is included in the polymer can be calculated by using measurement results obtained through measurement of the iodine value of the hydrogenated polymer, as necessary, in conjunction with measurement results obtained by $^1$H-NMR.

Moreover, the "total proportion of the linear alkylene structural unit having a carbon number of 4 or more and the conjugated diene monomer unit (hereinafter, also indicated simply as proportion (A))" in the polymer and the previously described "proportion of the aromatic vinyl monomer unit (hereinafter, also indicated simply as proportion (B))" in the polymer preferably satisfy a relationship of 0.2≤(proportion (A) [mass %])/(proportion (B) [mass %])≤2.0, and more preferably satisfy a relationship of 0.3≤(proportion (A) [mass %])/(proportion (B) [mass %]) 1.80. When any of these relationships is satisfied, it is possible to achieve an even better balance of inhibiting spring-back during electrode formation and enhancing output characteristics of an obtained secondary battery.

[Other Monomer Units]

Examples of other monomers that can form other monomer units include (meth)acrylic acid ester monomers and known monomers that are copolymerizable with the monomers described above.

One of these monomers may be used individually, or two or more of these monomers may be used in combination.

Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate.

The proportion in which a (meth)acrylic acid ester monomer unit is included in the polymer is preferably 1.0 mass % or more, and is preferably 20.0 mass % or less, more preferably 18.0 mass % or less, and even more preferably 15.0 mass % or less. When the proportion in which the (meth)acrylic acid ester monomer unit is included in the polymer is not less than the lower limit set forth above, cycle characteristics of an obtained secondary battery can be further enhanced. Although the reason for this is not clear, it is presumed that in the same way as for the nitrile group-containing monomer unit and the hydrophilic group-containing monomer unit, the (meth)acrylic acid ester monomer unit in the polymer improves binding strength of the polymer and can increase peel strength of a positive electrode formed using the binder composition. Moreover, when the proportion in which the (meth)acrylic acid ester monomer unit is included in the polymer is not more than any of the upper limits set forth above, an excessive increase of the degree of swelling in electrolyte solution of the polymer can be well inhibited. This enables further enhancement of output characteristics of an obtained secondary battery.

Note that in a case in which the polymer includes another monomer unit other than a (meth)acrylic acid ester monomer unit, the proportion in which the other monomer unit is included is preferably 20 mass % or less, and more preferably 10 mass % or less.

[Iodine Value]

The iodine value of the polymer is required to be not less than 60 mg/100 mg and not more than 150 mg/100 mg, is preferably 130 mg/100 mg or less, and is more preferably 120 mg/100 mg or less. When the iodine value of the polymer is not less than the lower limit set forth above, dispersibility of solid content in a slurry composition can be increased to a suitable degree due to a synergistic effect with the aromatic vinyl monomer unit included in the polymer. Moreover, when the iodine value of the polymer is not more than any of the upper limits set forth above, the polymer has high structural stability, and cycle characteristics of a secondary battery can be enhanced. Moreover, when the iodine value of the polymer is not more than any of the upper limits set forth above, it is presumed that cycle characteristics of a secondary battery can also be enhanced through the polymer being inhibited from readily swelling in a positive electrode in accompaniment to charging and discharging as a result of the high structural stability of the polymer. Furthermore, when the iodine value of the polymer is not more than any of the upper limits set forth above, the polymer has a suitable degree of flexibility, the ease of pressing in a pressing step can be increased, and the occurrence of spring-back can be inhibited. Note that the iodine value of the polymer can be controlled by, for example, adjusting the chemical composition of the polymer and, in a case in which the polymer is a hydrogenated polymer, adjusting the percentage hydrogenation of the polymer.

[Relationship Between Iodine Value and Proportions of Monomer Units]

From a viewpoint of improving output characteristics and cycle characteristics of an obtained secondary battery in an even better balance, it is preferable that the proportions in which the aromatic vinyl monomer unit, the conjugated diene monomer unit, and the linear alkylene structural unit having a carbon number of 4 or more are included in the polymer and the iodine value of the polymer satisfy a relationship such as described below.

Specifically, when the total proportion in which the conjugated diene monomer unit and the linear alkylene structural unit having a carbon number of 4 or more are included in the polymer is taken to be A mass %, the proportion in which the aromatic vinyl monomer unit is included in the polymer is taken to be B mass %, and the iodine value of the polymer is taken to be IV (mg/100 mg), the following relationship:

$$10 \leq \{A/(A+B)\} \times IV \leq 90$$

is preferably satisfied. Moreover, the value of $\{A/(A+B)\} \times IV$ is preferably 20 or more, and is preferably 80 or less, and more preferably 75 or less.

When the value of $\{A/(A+B)\} \times IV$ is not less than any of the lower limits set forth above, a high-density positive electrode can be obtained, and output characteristics of a secondary battery can be further enhanced. When the value of $\{A/(A+B)\} \times IV$ is not more than any of the upper limits set forth above, an excessive increase of the degree of swelling in electrolyte solution of the polymer can be inhibited, and output characteristics of a secondary battery can be further enhanced. Moreover, when the value of $\{A/(A+B)\} \times IV$ is not more than any of the upper limits set forth above, it is possible to inhibit swellability of the polymer readily increasing in accompaniment to charging and discharging, to inhibit reduction of close adherence between a current collector and an electrode mixed material layer in accompaniment to charging and discharging, and to further enhance cycle characteristics of a secondary battery.

[Glass-Transition Temperature]

The glass-transition temperature of the polymer is preferably −50° C. or higher, more preferably −40° C. or higher, and even more preferably −30° C. or higher, and is preferably 50° C. or lower. When the glass-transition temperature of the polymer is within any of the ranges set forth above, output characteristics and cycle characteristics of an obtained secondary battery can be further improved. Note that the "glass-transition temperature" of the polymer can be measured in accordance with JIS K7121(1987). Moreover, the glass-transition temperature of the polymer can be controlled by, for example, adjusting the chemical composition of the polymer and, in a case in which the polymer is a hydrogenated polymer, adjusting the percentage hydrogenation of the polymer.

[Mooney Viscosity]

The Mooney viscosity ($ML_{1+4}$, 100° C.) of the polymer is preferably 50 or more, more preferably 60 or more, and even more preferably 70 or more, and is preferably 200 or less, more preferably 180 or less, and even more preferably 170 or less. When the Mooney viscosity of the polymer is not less than any of the lower limits set forth above, dispersibility of solid content in a slurry composition can be improved to a suitable degree. On the other hand, when the Mooney viscosity of the polymer is not more than any of the upper limits set forth above, coatability of a slurry composition can be increased. Note that the "Mooney viscosity ($ML_{1+4}$, 100° C.)" of the polymer can be measured in accordance with JIS K6300-1 by a method described in the EXAMPLES section. Moreover, the Mooney viscosity of the polymer can be adjusted by, for example, altering the chemical composition of the polymer, the production conditions of the polymer (for example, the amount of chain transfer agent, the polymerization temperature, the polymerization conversion rate at the end of polymerization, etc.), and so forth.

[Production Method of Polymer]

Although no specific limitations are placed on the production method of the polymer set forth above, the polymer can be produced by, for example, performing polymerization of a monomer composition containing the monomers described above, optionally in the presence of a chain transfer agent, to obtain a polymer, and subsequently hydrogenating the obtained polymer.

The proportion in which each monomer is contained in the monomer composition used in production of the polymer can be set in accordance with the proportion in which each repeating unit is included in the polymer.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

The method of hydrogenation of the polymer is also not specifically limited and can be a typical method in which a catalyst is used (for example, refer to WO2012/165120A1, WO2013/080989A1, and JP2013-8485A).

[Solvent]

The binder composition may contain a solvent. The solvent is not specifically limited and can be an organic solvent. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide and N-methyl-2-pyrrolidone (NMP); and aromatic hydrocarbons such as toluene, xylene, chlorobenzene, orthodichlorobenzene, and paradichlorobenzene. One of these solvents may be used individually, or two or more of these solvents may be used as a mixture.

Of these examples, NMP is preferable as the solvent.

[Other Components]

In addition to the components described above, the presently disclosed binder composition may contain components such as polymers having different chemical compositions to the previously described polymer and known additives such as those described in JP2013-179040A. One of these components may be used individually, or two or more of these components may be used in combination in a freely selected ratio.

Examples of polymers having a different chemical composition to the previously described polymer include polyacrylonitrile, polymethyl methacrylate, and fluorine-containing polymers such as polyvinylidene fluoride (PVDF). These polymers differ from the polymer contained in the presently disclosed binder composition in terms that either they do not include at least one among a nitrile group-containing monomer unit, an aromatic vinyl monomer unit, a hydrophilic group-containing monomer unit, a conjugated diene monomer unit, and a linear alkylene structural unit having a carbon number of 4 or more, or, in a case in which they do include all of these units, the proportion in which the aromatic vinyl monomer unit is included is less than 30.0 mass % or more than 60.0 mass %. Alternatively, even in the case of a given polymer that includes all of these monomer units, the polymer differs from the polymer contained in the presently disclosed binder composition in terms that the iodine value thereof is less than 60 mg/100 mg or more than 150 mg/100 mg. In one example, even in the case of a given polymer that includes not less than 30.0 mass % and not more than 60.0 mass % of an aromatic vinyl monomer unit and that has an iodine value of not less than 60 mg/100 mg and not more than 150 mg/100 mg, the given polymer differs from the polymer contained in the presently disclosed binder composition in terms that, for example, the given polymer does not include a linear alkylene structural unit having a carbon number of 4 or more.

The proportion in which a polymer having a different chemical composition to the previously described polymer is contained in the binder composition when the total amount of the previously described polymer and the polymer having a different chemical composition to the previously described polymer is taken to be 100 mass % is preferably less than 50 mass %, and more preferably less than 20 mass %.

(Slurry Composition for Secondary Battery Positive Electrode)

The presently disclosed slurry composition for a secondary battery positive electrode contains a positive electrode active material, a solvent, and the binder composition set forth above, and optionally further contains a conductive material and other components. In other words, the presently disclosed slurry composition for a secondary battery positive electrode contains a positive electrode active material, a solvent, and the previously described polymer, and optionally further contains a conductive material and other components. The presently disclosed slurry composition for a secondary battery positive electrode enables formation of a secondary battery having excellent output characteristics and cycle characteristics as a result of containing the binder composition set forth above.

Although the following describes, as one example, a case in which the slurry composition for a secondary battery positive electrode is a slurry composition for a lithium ion secondary battery positive electrode, the presently disclosed slurry composition for a secondary battery positive electrode is not limited to the following example.

<Positive Electrode Active Material>

The positive electrode active material is a material that gives and receives electrons in a positive electrode of a secondary battery. A material that can occlude and release lithium is normally used as a positive electrode active material for a lithium ion secondary battery.

Specific examples of positive electrode active materials for lithium ion secondary batteries include, but are not specifically limited to, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$. The lithium-containing complex oxide of Co—Ni—Mn may be $Li(Ni_{0.5}Co_{0.2}Mn_{0.3})O_2$, $Li(Ni_{1/3}Co_{1/3}Mn_{1/3})O_2$, or the like.

Of these examples, lithium-containing cobalt oxide ($LiCoO_2$), lithium-containing nickel oxide ($LiNiO_2$), a lithium-containing complex oxide of Co—Ni—Mn, $Li[Ni_{0.17}Li_{0.2}Co_{0.07}Mn_{0.56}]O_2$, and $LiNi_{0.5}Mn_{1.5}O_4$ are preferable as the positive electrode active material from a viewpoint of improving battery capacity and the like of a secondary battery, with a lithium-containing complex oxide of Co—Ni—Mn being more preferable.

The amount and particle diameter of the positive electrode active material may be, but are not specifically limited to, the same as those of conventionally-used positive electrode active materials.

<Conductive Material>

The conductive material is a material for ensuring electrical contact amongst the positive electrode active material. Examples of conductive materials that can be used include conductive carbon materials such as carbon black (for example, acetylene black, Ketjenblack® (Ketjenblack is a registered trademark in Japan, other countries, or both), furnace black, etc.), graphene, graphite, carbon fiber, carbon flakes, and carbon nanofiber (for example, carbon nanotubes, vapor-grown carbon fiber, etc.); and fibers and foils of various metals. Of these examples, carbon black is preferable and acetylene black is more preferable as the conductive material.

One of these conductive materials may be used individually, or two or more of these conductive materials may be used in combination.

<Binder Composition>

The presently disclosed binder composition for a secondary battery positive electrode set forth above is used as the binder composition.

<Solvent>

The solvent can be any of the various solvents listed as solvents that can be contained in the presently disclosed binder composition for a secondary battery positive electrode.

<Content Ratio>

The content ratio of the conductive material in the slurry composition is preferably not less than 1 part by mass and not more than 20 parts by mass when the content of the positive electrode active material is taken to be 100 parts by mass. When the ratio of the conductive material is not less than the lower limit set forth above, electrical contact amongst the positive electrode active material can be promoted. Moreover, when the amount of the conductive material is not more than the upper limit set forth above, viscosity stability of the slurry composition can be increased.

The content ratio of the polymer in the slurry composition is preferably not less than 0.1 parts by mass and not more than 3.1 parts by mass when the content of the positive electrode active material is taken to be 100 parts by mass. It is thought that when the amount of the polymer is not less than the lower limit set forth above, a positive electrode having low volume resistance can be formed through increased close adherence between a current collector and a positive electrode mixed material layer. Moreover, when the amount of the polymer is not more than the upper limit set forth above, the proportion constituted by the polymer in a positive electrode mixed material layer formed using the slurry composition can be inhibited from becoming excessively high, and reduction of secondary battery capacity can be inhibited.

<Other Components>

Examples of other components that may be contained in the slurry composition include, but are not specifically limited to, the same other components as may be contained in the presently disclosed binder composition. One of such other components may be used individually, or two or more of such other components may be used in combination in a freely selected ratio.

<Production Method of Slurry Composition>

The slurry composition set forth above can be produced by dissolving or dispersing the above-described components in a solvent such as an organic solvent. Specifically, the slurry composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX. Note that the solvent contained in the binder composition may be used as a solvent in production of the slurry composition. No specific limitations are placed on the order of addition of components during production, and the components may be mixed at once or in stages. From a viewpoint of increasing dispersibility of the conductive material, it is preferable that a step of mixing the positive electrode active material and the conductive material to obtain a positive electrode active material-conductive material mixture is performed before performing a step of adding the binder composition to the positive electrode active material-conductive material mixture to obtain a positive electrode active material-conductive material-binder mixture, and then performing a step of adding the solvent to the positive electrode active material-conductive material-binder mixture and mixing the solvent therewith. Note that the step of obtaining a positive electrode active material-conductive material mixture is preferably implemented in the absence of a solvent.

(Positive Electrode for Secondary Battery)

The presently disclosed positive electrode for a secondary battery includes a current collector and a positive electrode mixed material layer formed on the current collector, wherein the positive electrode mixed material layer is formed using the slurry composition for a secondary battery positive electrode set forth above. In other words, the positive electrode mixed material layer contains at least a positive electrode active material and a polymer. It should be noted that components contained in the positive electrode mixed material layer are components that were contained in the slurry composition for a secondary battery positive electrode set forth above, and the preferred ratio of these components in the positive electrode mixed material layer is the same as the preferred ratio of these components in the slurry composition.

The presently disclosed positive electrode for a secondary battery has high electrode density and high adhesive strength between the current collector and the positive electrode mixed material layer as a result of the presently disclosed positive electrode for a secondary battery being produced using a slurry composition that contains the presently disclosed binder composition for a secondary battery positive electrode. Therefore, the positive electrode can be used to obtain a secondary battery having excellent output characteristics and cycle characteristics.

<Production Method of Positive Electrode>

Note that the presently disclosed positive electrode for a secondary battery is produced, for example, through a step of applying the slurry composition set forth above onto the current collector (application step) and a step of drying the slurry composition that has been applied onto the current collector to form the positive electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the positive electrode mixed material layer that is to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. Of these materials, aluminum foil is particularly preferable as a current collector used for a positive electrode. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, a positive electrode mixed material layer is formed on the current collector and thus a positive electrode for a secondary battery including the current collector and the positive electrode mixed material layer can be obtained.

After the drying step, the positive electrode mixed material layer may be further subjected to a pressing process such as mold pressing or roll pressing. The pressing process can effectively increase the density of the positive electrode mixed material layer and can also improve close adherence and adhesive strength of the positive electrode mixed material layer and the current collector. Furthermore, when the positive electrode mixed material layer contains a curable polymer, the polymer is preferably cured after formation of the positive electrode mixed material layer.

The presently disclosed slurry composition for a secondary battery positive electrode contains the specific polymer set forth above and has suitably high dispersibility of solid content. This enables effective densification of the positive electrode by a pressing process and also makes it harder for spring-back to occur. Therefore, battery characteristics of a secondary battery can be sufficiently improved through use of the presently disclosed slurry composition for a secondary battery positive electrode even in a case in which a pressing process is performed during positive electrode production.

(Secondary Battery)

The presently disclosed secondary battery includes a positive electrode, a negative electrode, an electrolyte solution, and a separator, wherein the presently disclosed positive electrode for a secondary battery is used as the positive electrode. The presently disclosed secondary battery has excellent output characteristics and cycle characteristics as a result of including the presently disclosed positive electrode for a secondary battery.

Although the following describes, as one example, a case in which the secondary battery is a lithium ion secondary battery, the presently disclosed secondary battery is not limited to the following example.

<Negative Electrode>

Any known negative electrode can be used as the negative electrode. Specifically, the negative electrode may, for example, be a negative electrode formed of a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer can be a layer that contains a negative electrode active material and a binder. The binder is not specifically limited and may be freely selected from known materials.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used. The concentration of the supporting electrolyte in the electrolyte solution (25° C.) can be not less than 0.5 mol/L and not more than 2.0 mol/L, for example.

No specific limitations are placed on the organic solvent used in the electrolyte solution so long as the supporting electrolyte can dissolve therein. Suitable examples include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, with the use of a mixture of ethylene carbonate and diethyl carbonate being preferable. Moreover, additives such as vinylene carbonate (VC), fluoroethylene carbonate, and ethyl methyl sulfone can be added to the electrolyte solution. Of these additives, addition of vinylene carbonate is preferable.

<Separator>

Examples of separators that can be used include, but are not specifically limited to, those described in JP2012-204303A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the capacity per volume.

<Production Method of Secondary Battery>

The presently disclosed secondary battery can be produced by, for example, stacking the positive electrode and the negative electrode with the separator in-between, performing rolling, folding, or the like of the resultant stack in accordance with the battery shape, as necessary, to place the stack in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified. Also note that pressures are gauge pressures.

In the examples and comparative examples, the following methods were used to measure and evaluate the chemical composition, iodine value, glass-transition temperature, and Mooney viscosity of a polymer, the density and amount of spring-back of a positive electrode, and the output characteristics and cycle characteristics of a secondary battery.

<Chemical Composition of Polymer>

After coagulating 100 g of a binder composition for a positive electrode produced in each example or comparative example in 1 L of methanol, vacuum drying was performed at a temperature of 60° C. for 12 hours. The dried polymer obtained in this manner was analyzed by $^1$H-NMR. The proportion (mass %) in which each monomer unit and structural unit was included in the polymer was then calculated based on values obtained through this analysis.

<Iodine Value of Polymer>

After coagulating 100 g of an NMP dispersion of a polymer (binder composition) produced in each example or comparative example in 1 L of methanol, vacuum drying was performed at a temperature of 60° C. for 12 hours. The iodine value of the dried polymer obtained in this manner was measured in accordance with JIS K6235(2006).

<Glass-Transition Temperature of Polymer>

The glass-transition temperature of a dried polymer produced in the same way as in measurement of "Chemical composition of polymer" described above was measured based on JIS K 7121(1987) using a differential scanning calorimeter (DSC6220 produced by SII NanoTechnology Inc.).

<Mooney Viscosity of Polymer>

After coagulating a water dispersion of a polymer in methanol, vacuum drying was performed at a temperature of 60° C. for 12 hours. Next, 40 g of the obtained copolymer was used to measure the Mooney viscosity in accordance with JIS K6300-1 at a temperature of 100° C.

<Density of Positive Electrode>

The density of a positive electrode obtained in each example or comparative example was evaluated in accordance with the following standard.

A: 3.2 g/cm$^3$ or more
B: Not less than 3.1 g/cm$^3$ and less than 3.2 g/cm$^3$
C: Not less than 3.0 g/cm$^3$ and less than 3.1 g/cm$^3$
D: Less than 3.0 g/cm$^3$ <Amount of Spring-Back of Positive Electrode>

A positive electrode obtained in each example or comparative example was compressed to a maximum load of 3,000 mN at a loading rate of 207 mN/s using a micro compression tester (MCT-W500J produced by Shimadzu Corporation) under room temperature conditions. Thereafter, the compression was released and the amount of recovery after 3 minutes at room temperature was measured as the amount of spring-back (µm). The measured value was evaluated in accordance with the following standard.

A: 15 µm or less
B: More than 15 µm and not more than 18 µm
C: More than 18 µm and less than 20 µm
D: 20 µm or more <Output Characteristics of Secondary Battery>

A secondary battery produced in each example or comparative example was constant-current charged at 0.2C until the battery voltage reached 4.2 V and was subsequently constant-voltage charged at 4.2 V until the charging current reached 0.02C under conditions of 25° C. Next, the secondary battery was constant-current discharged at 0.2C until the battery voltage reached 3.0 V, and the initial capacity of the secondary battery was measured. Thereafter, the secondary battery for which initial capacity had been measured was constant-current charged at 0.2C until the battery voltage reached 4.2 V and was subsequently constant-voltage charged at 4.2 V until the charging current reached 0.02C. Next, the secondary battery was constant-current discharged at 3C until the battery voltage reached 3.0 V, and the 3C capacity was measured. An output characteristic (={(3C capacity)/(initial capacity)}×100%) was calculated and was evaluated by the following standard. Note that evaluation was carried out in a 20° C. environment.

A: Output characteristic of 92% or more
B: Output characteristic of not less than 88% and less than 92%
C: Output characteristic of not less than 85% and less than 88%
D: Output characteristic of less than 85%

<Cycle Characteristics of Secondary Battery>

A secondary battery obtained in each example or comparative example was subjected to 200 charge/discharge cycles of charging to 4.2 V and discharging to 3.0 V by a 0.5C constant-current method in a 50° C. environment. A charge/discharge capacity retention rate expressed by a ratio of electric capacity at the end of 200 cycles and electric capacity at the end of 5 cycles (=electric capacity at end of 200 cycles/electric capacity at end of 5 cycles×100) (%) was determined. A larger value for the charge/discharge capacity retention rate indicates better cycle characteristics in a high-temperature environment.

A: Charge/discharge capacity retention rate of 85% or more
B: Charge/discharge capacity retention rate of not less than 80% and less than 85%
C: Charge/discharge capacity retention rate of not less than 70% and less than 80%
D: Charge/discharge capacity retention rate of less than 70%

Example 1

<Production of Polymer>

An autoclave equipped with a stirrer was charged with 240 parts of deionized water, 2.5 parts of sodium alkylbenzene sulfonate as an emulsifier, 0.2 parts by mass of tert-dodecyl mercaptan as a chain transfer agent, 13 parts of acrylonitrile as a nitrile group-containing monomer, 46 parts of styrene as an aromatic vinyl monomer, 2 parts of methacrylic acid as a hydrophilic group-containing monomer, and 3 parts of methyl methacrylate as a (meth)acrylic acid ester monomer, in this order, and the inside of the autoclave was purged with nitrogen. Thereafter, 36 parts of 1,3-butadiene as a conjugated diene monomer was injected into the autoclave, 0.25 parts of ammonium persulfate was added as a polymerization initiator, and a polymerization reaction was carried out at a reaction temperature of 40° C. to yield a copolymer including a nitrile group-containing monomer unit, an aromatic vinyl monomer unit, a hydrophilic group-containing monomer unit, a conjugated diene monomer unit, and a (meth)acrylic acid ester monomer unit. The polymerization conversion rate was 85%.

Deionized water was added to the pre-hydrogenation polymer to obtain 400 mL of a solution adjusted to a total solid content concentration of 12 mass % (total solid content: 48 g). This solution was loaded into an autoclave of 1 L in capacity that was equipped with a stirrer, and dissolved oxygen in the solution was removed by passing nitrogen gas for 10 minutes. Thereafter, 35 mg of palladium acetate as a hydrogenation reaction catalyst was dissolved in 180 mL of deionized water to which nitric acid had been added in an amount of 4 molar equivalents relative to the palladium (Pd), and the resultant solution was added into the autoclave. Purging of the system with hydrogen gas was performed twice, and then the contents of the autoclave were heated to 50° C. in a state in which the pressure was raised to 3 MPa with hydrogen gas, and a hydrogenation reaction was carried out for 6 hours.

The contents of the autoclave were subsequently restored to normal temperature, the system was converted to a nitrogen atmosphere, and then an evaporator was used to perform concentrating until the solid content concentration reached 40% to yield a water dispersion of a polymer. The Mooney viscosity was measured as previously described. The result is shown in Table 1.

<Production of Binder Composition for Positive Electrode>

A binder composition for a positive electrode containing a specific polymer was obtained by adding 320 parts of N-methylpyrrolidone (hereinafter, also referred to as "NMP") as a solvent to 100 parts of the water dispersion of the polymer obtained as described above and then evaporating water under reduced pressure. The chemical composition, iodine value, and glass-transition temperature of the polymer were measured as previously described. The results are shown in Table 1.

<Production of Slurry Composition for Positive Electrode>

First, 96 parts of Li(Ni$_{0.5}$Co$_{0.2}$Mn$_{0.3}$)O$_2$ (average particle diameter: 10 μm) as a positive electrode active material and 2.0 parts of acetylene black (produced by Denka Company Limited; product name: HS-100) as a conductive material were mixed inside a planetary mixer. Next, 2.0 parts in terms of solid content of the binder composition for a positive electrode described above (solid content concentration: 8.0%) was added to the resultant mixture and was mixed therewith, and then N-methylpyrrolidone (NMP) was added and mixed as a solvent to adjust the viscosity measured by a B-type viscometer (rotation speed: 60 rpm) to 4,000 mPa·s and thereby produce a slurry composition for a positive electrode.

<Production of Positive Electrode>

Aluminum foil of 20 μm in thickness was prepared as a current collector. The slurry composition for a positive electrode produced as described above was applied such that the coating weight after drying per one side of the aluminum foil was 22 mg/cm$^2$. The coating film on the aluminum foil was dried at 80° C. for 20 minutes and at 120° C. for 20 minutes, and then 2 hours of heat treatment was performed at 150° C. to obtain a positive electrode web including a pre-pressing positive electrode mixed material layer and a current collector. The positive electrode web was roll pressed with a line pressure of 1,500 kg/cm to produce a sheet-shaped positive electrode including aluminum foil and a positive electrode mixed material layer of 3.2 g/cm$^3$ in density. Measurement and evaluation of the amount of spring-back for the produced positive electrode were carried out as previously described. The result is shown in Table 1.

<Production of Negative Electrode>

A slurry composition for a negative electrode was produced by adding a mixture of 90 parts of spherical artificial graphite (volume-average particle diameter: 12 μm) and 10 parts of SiO$_x$ (volume-average particle diameter: 10 μm) as a negative electrode active material, 1 part of styrene butadiene rubber (number-average particle diameter: 180 nm; glass-transition temperature: 10° C.) as a binder for a negative electrode, 1 part of carboxymethyl cellulose as a thickener, and an appropriate amount of deionized water into a planetary mixer and stirring these materials.

Next, copper foil of 15 μm in thickness was prepared as a current collector. The slurry composition for a negative electrode produced as described above was applied such that the coating weight after drying per one side of the copper foil was 12 mg/cm$^2$. The coating film on the copper foil was dried at 50° C. for 20 minutes and at 110° C. for 20 minutes, and then 2 hours of heat treatment was performed at 150° C. to obtain a negative electrode web. The negative electrode web was rolled by roll pressing to obtain a sheet-shaped negative electrode including copper foil and a negative electrode mixed material layer of 1.6 g/cm$^3$ in density.

<Production of Lithium ion Secondary Battery>

Lead wires were respectively connected to the positive electrode and the negative electrode that were produced as described above. The positive electrode and the negative electrode were then stacked with a separator (microporous membrane made from polypropylene) of 20 μm in thickness interposed in-between. Separately to the above, LiPF$_6$ as a supporting electrolyte was dissolved in a mixture of ethylene carbonate (EC):diethyl carbonate (DEC)=3:7 (by mass) such that the concentration of LiPF$_6$ was 1.0 M. Vinylene carbonate (VC) as an additive was then added to the mixture in which LiPF$_6$ had been dissolved such that the concentration of vinylene carbonate was 2 mass %, and, in this manner, an electrolyte solution was produced.

The stack was housed inside a laminate case made from aluminum together with 3.2 g of the electrolyte solution. An opening of the case was then sealed by heat to obtain a lithium ion secondary battery. The lithium ion secondary battery was a pouch-type battery of 35 mm in width, 48 mm in height, and 5 mm in thickness, and having a nominal capacity of 40 mAh.

The produced lithium ion secondary battery was used to evaluate output characteristics and cycle characteristics as previously described. The results are shown in Table 1.

Example 2

Various operations, measurements, and evaluations were performed in the same way as in Example 1 with the exception that in production of the polymer, the amount of acrylonitrile was changed to 10 parts, the amount of styrene was changed to 33 parts, the amount of methacrylic acid was changed to 1 part, the amount of methyl methacrylate was changed to 1 part, the amount of 1,3-butadiene was changed to 55 parts, and the additive amount of palladium acetate and the hydrogenation reaction time were adjusted as appropriate such that the iodine value of the obtained polymer was a value recorded in Table 1. The results are shown in Table 1.

Example 3

Various operations, measurements, and evaluations were performed in the same way as in Example 1 with the exception that in production of the polymer, the amount of styrene was changed to 55 parts, the amount of methacrylic acid was changed to 1 part, the amount of methyl methacrylate was changed to 1 part, the amount of 1,3-butadiene was changed to 30 parts, and the additive amount of palladium acetate and the hydrogenation reaction time were adjusted as appropriate such that the iodine value of the obtained polymer was a value recorded in Table 1. The results are shown in Table 1.

Example 4

Various operations, measurements, and evaluations were performed in the same way as in Example 1 with the exception that in production of the polymer, methyl methacrylate was not used, the amount of 1,3-butadiene was changed to 39 parts, and the additive amount of palladium acetate and the hydrogenation reaction time were adjusted as appropriate such that the iodine value of the obtained polymer was a value recorded in Table 1. The results are shown in Table 1.

Example 5

Various operations, measurements, and evaluations were performed in the same way as in Example 1 with the exception that in production of the polymer, the amount of acrylonitrile was changed to 8 parts, the amount, the amount of 1,3-butadiene was changed to 41 parts, and the additive amount of palladium acetate and the hydrogenation reaction time were adjusted as appropriate such that the iodine value of the obtained polymer was a value recorded in Table 1. The results are shown in Table 1.

Example 6

Various operations, measurements, and evaluations were performed in the same way as in Example 1 with the exception that in production of the polymer, the amount of acrylonitrile was changed to 20 parts, the amount of styrene was changed to 50 parts, the amount of methacrylic acid was changed to 5 parts, the amount of methyl methacrylate was changed to 5 parts, the amount of 1,3-butadiene was changed to 20 parts, and the additive amount of palladium acetate and the hydrogenation reaction time were adjusted as appropriate such that the iodine value of the obtained polymer was a value recorded in Table 1. The results are shown in Table 1.

Comparative Example 1

Various operations, measurements, and evaluations were performed in the same way as in Example 1 with the exception that in production of the polymer, the amount of styrene was changed to 28 parts, the amount of methacrylic acid was changed to 1 part, the amount of 1,3-butadiene was changed to 55 parts, and the additive amount of palladium acetate and the hydrogenation reaction time were adjusted as appropriate such that the iodine value of the obtained polymer was a value recorded in Table 1. The results are shown in Table 1.

Comparative Example 2

Various operations, measurements, and evaluations were performed in the same way as in Example 1 with the exception that in production of the polymer, the amount of styrene was changed to 67 parts, the amount of methacrylic acid was changed to 1 part, the amount of methyl methacrylate was changed to 1 part, the amount of 1,3-butadiene was changed to 18 parts, and the additive amount of palladium acetate and the hydrogenation reaction time were adjusted as appropriate such that the iodine value of the obtained polymer was a value recorded in Table 1. The results are shown in Table 1.

Comparative Example 3

Various operations, measurements, and evaluations were performed in the same way as in Example 1 with the exception that in production of the polymer, the amount of acrylonitrile was changed to 20 parts, the amount of styrene was changed to 45 parts, the amount of methacrylic acid was changed to 1 part, the amount of methyl methacrylate was changed to 4 parts, the amount of 1,3-butadiene was changed to 30 parts, and the additive amount of palladium acetate and the hydrogenation reaction time were adjusted as appropriate such that the iodine value of the obtained polymer was a value recorded in Table 1. The results are shown in Table 1.

Comparative Example 4

Various operations, measurements, and evaluations were performed in the same way as in Example 1 with the exception that in production of the polymer, the amount of styrene was changed to 37 parts, the amount of methacrylic acid was changed to 1 part, the amount of 1,3-butadiene was changed to 46 parts, and the additive amount of palladium acetate and the hydrogenation reaction time were adjusted as appropriate such that the iodine value of the obtained polymer was a value recorded in Table 1. The results are shown in Table 1.

In Table 1:
"AN" indicates acrylonitrile unit;
"ST" indicates styrene unit;
"MAA" indicates methacrylic acid unit;
"MMA" indicates methyl methacrylate unit;
"BD" indicates 1,3-butadiene monomer-derived unit other than H-BD;
"H-BD" indicates hydrogenated 1,3-butadiene unit;

"AB" indicates acetylene black; and
"NCM" indicates Li(Ni$_{0.5}$Co$_{0.2}$Mn$_{0.3}$)O$_2$.

TABLE 1

| | | | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|---|---|
| Slurry composition for positive electrode | Polymer | Nitrile group-containing monomer unit | AN (mass %) | 13 | 10 | 13 | 13 | 8 | 20 | 13 | 13 | 20 | 13 |
| | | Aromatic vinyl monomer unit | ST (mass %) | 46 | 33 | 55 | 46 | 46 | 50 | 28 | 67 | 45 | 37 |
| | | Hydrophilic group-containing monomer unit | MAA (mass %) | 2 | 1 | 1 | 2 | 2 | 5 | 1 | 1 | 1 | 1 |
| | | Methacrylic acid ester monomer unit | MMA (mass %) | 3 | 1 | 1 | 0 | 3 | 5 | 3 | 1 | 4 | 3 |
| | | (Conjugated diene + linear alkylene) unit | {BD + (H − BD)} (mass %) | 36 | 55 | 30 | 39 | 41 | 20 | 55 | 18 | 30 | 46 |
| | | | Inclusion of linear alkylene structural unit | Yes | Yes | Yes | Yes | Yes | Yes | Yes | Yes | Yes | Yes |
| | | | (AN/ST) ratio (−) | 0.28 | 0.30 | 0.24 | 0.28 | 0.17 | 0.40 | 0.46 | 0.19 | 0.44 | 0.35 |
| | | | ({BD + (H − BD)}/ST) ratio (−) | 0.78 | 1.67 | 0.55 | 0.85 | 0.89 | 0.40 | 1.96 | 0.27 | 0.67 | 1.24 |
| | | | Iodine value (mg/100 mg) | 75 | 120 | 62 | 75 | 75 | 75 | 75 | 75 | 45 | 170 |
| | | | {(BD + (H − BD))/(ST + BD + (H − BD))} × Iodine value (−) | 32.9 | 75.0 | 21.9 | 34.4 | 35.3 | 21.4 | 49.7 | 15.9 | 18.0 | 94.2 |
| | | | Glass-transition temperature (° C.) | 12 | −24 | 22 | 4 | 1 | 47 | −22 | 55 | 25 | 0 |
| | | | Mooney viscosity (ML$_{1+4}$, 100° C.) | 120 | 110 | 22 | 110 | 130 | 120 | 100 | 100 | 100 | 100 |
| | | | Amount (parts by mass) | 2.1 | 2.1 | 2.1 | 2.1 | 2.1 | 2.1 | 2.1 | 2.1 | 2.1 | 2.1 |
| | Conductive material | AB (parts by mass) | | 2.1 | 2.1 | 2.1 | 2.1 | 2.1 | 2.1 | 2.1 | 2.1 | 2.1 | 2.1 |
| | Positive electrode active material | NCM (parts by mass) | | 100 | 100 | 100 | 100 | 100 | 100 | 100 | 100 | 100 | 100 |
| Electrode characteristics | Density | | | A | A | B | A | A | A | A | D | B | B |
| | Amount of spring-back | | | A | A | B | A | A | B | A | D | B | C |
| Battery characteristics | Output characteristics | | | A | B | B | A | B | A | D | C | D | D |
| | Cycle characteristics | | | A | A | A | B | B | B | C | B | D | D |

It can be seen from Table 1 that secondary batteries formed using the binder compositions of Examples 1 to 6 had excellent output characteristics and cycle characteristics.

On the other hand, it can be seen that the various good attributes achieved in Examples 1 to 6 could not be obtained in Comparative Example 1 in which the proportion in which an aromatic vinyl monomer unit was included in the polymer was less than 30.0 mass % and Comparative Example 2 in which this proportion was more than 60.0 mass %. Likewise, it can be seen that the various good attributes achieved in Examples 1 to 6 could not be obtained in Comparative Example 3 in which the iodine value of the polymer was less than 60 mg/100 mg and Comparative Example 4 in which this iodine value was more than 150 mg/100 mg.

INDUSTRIAL APPLICABILITY

According to the present disclosure, it is possible to provide a binder composition for a secondary battery positive electrode and a slurry composition for a secondary battery positive electrode that can be used to form a secondary battery having excellent output characteristics and cycle characteristics, and also to provide a method of producing this slurry composition.

Moreover, according to the present disclosure, it is possible to provide a positive electrode that can improve output characteristics and cycle characteristics of an obtained secondary battery and a secondary battery that has excellent output characteristics and cycle characteristics.

The invention claimed is:

1. A binder composition for a secondary battery positive electrode comprising a polymer, wherein
    the polymer includes a nitrile group-containing monomer unit, an aromatic vinyl monomer unit, a hydrophilic group-containing monomer unit, a conjugated diene monomer unit, and a linear alkylene structural unit having a carbon number of 4 or more,
    the aromatic vinyl monomer unit is included in the polymer in a proportion of not less than 30.0 mass % and not more than 60.0 mass %,
    the nitrile group-containing monomer unit is included in the polymer in a proportion of not less than 10 mass %,
    a total proportion of the conjugated diene monomer unit and the linear alkylene structural unit having a carbon number of 4 or more is 10.0 mass % or more and 50.0 mass % or less,
    the polymer has an iodine value of not less than 75 mg/100 mg and not more than 150 mg/100 mg, and
    the polymer has a Mooney viscosity ($ML_{1+4}$, 100° C.) of 70 or more and 200 or less.

2. The binder composition for a secondary battery positive electrode according to claim 1, wherein
    when a total proportion in which the conjugated diene monomer unit and the linear alkylene structural unit having a carbon number of 4 or more are included in the polymer is taken to be A mass %,
    a proportion in which the aromatic vinyl monomer unit is included in the polymer is taken to be B mass %, and
    the iodine value of the polymer is taken to be IV (mg/100 mg),
    a relationship of $10 \leq \{A/(A+B)\} \times IV \leq 90$ is satisfied.

3. The binder composition for a secondary battery positive electrode according to claim 1, wherein the polymer includes an acidic group-containing monomer unit in a proportion of not less than 0.1 mass % and not more than 20.0 mass % as the hydrophilic group-containing monomer unit.

4. The binder composition for a secondary battery positive electrode according to claim 1, wherein the polymer further includes a (meth)acrylic acid ester monomer unit.

5. The binder composition for a secondary battery positive electrode according to claim 4, wherein the polymer includes the (meth)acrylic acid ester monomer unit in a proportion of not less than 1.0 mass % and not more than 20.0 mass %.

6. A slurry composition for a secondary battery positive electrode comprising: a positive electrode active material; a solvent; and the binder composition for a secondary battery positive electrode according to claim 1.

7. A positive electrode for a secondary battery comprising a positive electrode mixed material layer formed using the slurry composition for a secondary battery positive electrode according to claim 6.

8. A secondary battery comprising: the positive electrode for a secondary battery according to claim 7; a negative electrode; an electrolyte solution; and a separator.

9. A method of producing a slurry composition for a secondary battery positive electrode comprising, in stated order:
    mixing a positive electrode active material and a conductive material to obtain a positive electrode active material-conductive material mixture;
    adding the binder composition for a secondary battery positive electrode according to claim 1 to the positive electrode active material-conductive material mixture to obtain a positive electrode active material-conductive material-binder mixture; and
    adding a solvent to the positive electrode active material-conductive material-binder mixture and mixing the solvent therewith.

* * * * *